US011443536B2

(12) United States Patent
Farhadi et al.

(10) Patent No.: US 11,443,536 B2
(45) Date of Patent: *Sep. 13, 2022

(54) SYSTEM AND METHODS FOR EFFICIENTLY IMPLEMENTING A CONVOLUTIONAL NEURAL NETWORK INCORPORATING BINARIZED FILTER AND CONVOLUTION OPERATION FOR PERFORMING IMAGE CLASSIFICATION

(71) Applicant: The Allen Institute for Artificial Intelligence, Seattle, WA (US)

(72) Inventors: Ali Farhadi, Seattle, WA (US); Mohammad Rastegari, Bothell, WA (US); Vicente Ignacio Ordonez Roman, Alexandria, VA (US)

(73) Assignee: The Allen Institute for Artificial Intelligence, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,123

(22) Filed: Jun. 3, 2019

(65) Prior Publication Data

US 2019/0286953 A1     Sep. 19, 2019

Related U.S. Application Data

(63) Continuation of application No. 15/487,091, filed on Apr. 13, 2017, now Pat. No. 10,311,342.
(Continued)

(51) Int. Cl.
*G06K 9/00*     (2022.01)
*G06T 1/40*     (2006.01)
(Continued)

(52) U.S. Cl.
CPC ......... *G06V 30/194* (2022.01); *G06K 9/6267* (2013.01); *G06N 3/04* (2013.01); *G06V 10/42* (2022.01)

(58) Field of Classification Search
CPC .......... G06K 9/66; G06K 9/52; G06K 9/6267; G06N 3/04
See application file for complete search history.

(56) References Cited

U.S. PATENT DOCUMENTS 10,311,342 B1 * 6/2019 Farhadi ............... G06K 9/6267
2007/0086655 A1 * 4/2007 Simard ............... G06K 9/4628
382/190

OTHER PUBLICATIONS

Gysel et al, "Hardware-Oriented Approximation of Convolutional Neural Networks", Apr. 11, 2016, arXiv: 1604.03168, 8 pages (Year: 2016).*

* cited by examiner

*Primary Examiner* — David F Dunphy
(74) *Attorney, Agent, or Firm* — Dentons US LLP

(57) ABSTRACT

Systems, apparatuses, and methods for efficiently and accurately processing an image in order to detect and identify one or more objects contained in the image, and methods that may be implemented on mobile or other resource constrained devices. Embodiments of the invention introduce simple, efficient, and accurate approximations to the functions performed by a convolutional neural network (CNN); this is achieved by binarization (i.e., converting one form of data to binary values) of the weights and of the intermediate representations of data in a convolutional neural network. The inventive binarization methods include optimization processes that determine the best approximations of the convolution operations that are part of implementing a CNN using binary operations.

35 Claims, 7 Drawing Sheets

Related U.S. Application Data

(60) Provisional application No. 62/322,544, filed on Apr. 14, 2016.

(51) Int. Cl.
*G06V 30/194* (2022.01)
*G06N 3/04* (2006.01)
*G06K 9/62* (2022.01)
*G06V 10/42* (2022.01)

Figure 5: Vision algorithm pipeline

| 210 Network Variations | 212 Operations used in Convolution | 214 Memory Saving (Inference) | 216 Time Saving on CPU (Inference) | 218 Accuracy on ImageNet (AlexNet) |
|---|---|---|---|---|
| Standard Convolution 204 — Real-Value Inputs (0.11 -0.21 ... -.34 -0.25 0.61 ...0.52), Real-Value Weights (0.12 1.2 ...0.41 -0.2 -.05 ...0.68) | +, −, × | 1x | 1x | %56.7 |
| Binary Weight 206 — Real-Value Inputs (0.11 -0.21 ... -.34 -0.25 0.61 ...0.52), Binary Weights (1 -1 ... 0.1 1 -1 ... 0.1) | +, − | ~32x | ~2x | %53.8 |
| Binary Weight Binary Input (XNOR-Net) 208 — Binary Inputs (1 -1 ... -1 -1 1 ... 1), Binary Weights (1 -1 ... 0.1 1 -1 ... 0.1) | XNOR, bitcount | ~32x | ~58x | %44.2 |

Figure 2(a)

A block in a conventional CNN (1)

A block in an embodiment of XNOR-Net (2)

SYSTEM AND METHODS FOR EFFICIENTLY IMPLEMENTING A CONVOLUTIONAL NEURAL NETWORK INCORPORATING BINARIZED FILTER AND CONVOLUTION OPERATION FOR PERFORMING IMAGE CLASSIFICATION

CROSS REFERENCE TO RELATED APPLICATION

This application is a continuation under 35 U.S.C. § 120 of U.S. patent application Ser. No. 14/487,091, filed 13 Apr. 2017, which claims the benefit of U.S. Provisional Application No. 62/322,544, entitled "System and Methods for Efficiently Implementing a Convolutional Neural Network Incorporating Binarized Filter and Convolution Operation for Performing Image Classification," filed Apr. 14, 2016, which is incorporated herein by reference in its entirety (including the Appendix) for all purposes.

BACKGROUND

Object detection and identification/classification are important aspects of many systems. These functions are based on the processing and interpretation of images, and are used in many applications and settings involving image, object, and pattern recognition, typically as part of a decision process. Example applications include security, access control, identification/authentication, machine vision, artificial intelligence, engineering, manufacturing, robotics, systems control, autonomous vehicles, and other situations involving some form of object or pattern recognition, object detection, or automated decision-making based on an image.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains including computer vision and speech recognition. In computer vision, a particular type of DNN, known as a Convolutional Neural Network (CNN), has demonstrated state-of-the-art results in object recognition and detection.

A convolutional neural network (CNN) is a special case of the neural network described above. A CNN consists of one or more convolutional layers, often with a subsampling layer, which are followed by one or more fully connected layers, as in a standard neural network. Convolutional neural networks (CNN) have been used for purposes of image processing, and have shown reliable results in object recognition and detection tasks that are useful in real world applications. Convolutional layers are useful for image processing, as they extract features from images relatively quickly and learn to extract the right features for the problem they are trained on (e.g., convolutional layers trained for classification will learn different filters (i.e., weights) than layers trained for regression, because different aspects or characteristics matter in each of those scenarios).

FIG. 1(a) is a diagram illustrating elements or stages of a conventional convolutional neural network (CNN) 100, showing one or more convolutional stages 102, sub-sampling 104, and fully connected stages 106 leading to the production of an output 108; FIG. 1(b) is a diagram illustrating a conventional image-processing pipeline, which may incorporate a convolutional neural network (CNN). As shown in FIG. 1(a), input data (such as a digitized representation of an image) is provided to one or more convolutional stages 102 (represented as "1st Stage" and "2nd Stage" in the figure). The output of each convolutional stage is provided as an input to the following stage; in some cases, further subsampling operations 104 may be carried out. A final subsampling stage acts as a Classifier, with an output being passed to one or more fully connected stages 106 to produce an output 108. In terms of the image processing pipeline shown in FIG. 1(b), note that the CNN is used primarily for purposes of object detection and object recognition, with other functions or operations being used to (pre)process an image (such as noise reduction, scaling, etc.) and to perform a decision making function.

In the traditional model of pattern/image recognition, a hand-designed feature extractor gathers relevant information from the input and eliminates irrelevant variabilities. A trainable classifier, a standard neural network that classifies feature vectors into classes, follows the extractor. In a CNN, convolution layers play the role of feature extractor, with the convolution filter kernel-weights being determined as part of the training process. Convolutional layers are able to extract the local features because they restrict the receptive fields of the hidden layers to be local.

In CNNs, the weights of the convolutional layer used for feature extraction, as well as the fully connected layer used for classification, are determined during a training process. The improved network structures of CNNs lead to savings in memory requirements and computation complexity requirements and, at the same time, give better performance for applications where the input has local correlation (e.g., images and speech).

By stacking multiple and different layers in a CNN, complex architectures are built for classification problems. Four types of layers are most common: convolution layers, pooling/subsampling layers, non-linear layers, and fully connected layers. The convolution operation extracts different features of the input. The first convolution layer extracts low-level features such as edges, lines, and corners; higher-level layers extract higher-level features. The pooling/subsampling layer operates to reduce the resolution of the features and makes the features more robust against noise and distortion. There are two ways to do pooling: max pooling and average pooling. Neural networks in general (and CNNs in particular) rely on a non-linear "trigger" function to signal distinct identification of likely features on each hidden layer. CNNs may use a variety of specific functions, such as rectified linear units (ReLUs) and continuous trigger (non-linear) functions, to efficiently implement this non-linear triggering function. Fully connected layers are often used as the final layers of a CNN. These layers mathematically sum a weighting of the previous layer of features, indicating the precise mix of factors to determine a specific target output result. In case of a fully connected layer, all of the elements of all the features of the previous layer are used in the calculation of each element of each output feature.

In addition to recent progress in the area of object recognition, advancements have been made in virtual reality, augmented reality, and "smart" wearable devices. These trends suggest that there is a market demand and need for implementing state-of-the-art image processing and object recognition in smart portable devices. However, conventional CNN-based recognition systems typically require relatively large amounts of memory and computational power to implement (as they typically require a large number of floating point calculations). Thus, while such CNN based systems perform well on expensive, GPU-based machines, they are often unsuitable for smaller devices such as cell/smart phones, tablet computing devices, and embedded electronic devices.

Conventional approaches to detecting objects in an image, while capable of yielding useful results, are not well suited for some applications and contexts. These include uses where certain of the image processing and object recognition operations are performed using less computational and data storage resources than conventional processors used for such tasks (such as GPUs). This is particularly true when computationally intensive approaches, such as conventional convolutional neural networks, are used for image processing. Thus, systems and methods are needed to provide for performing image processing and object recognition using CNNs that may be implemented on a resource-constrained device, such as a smart phone, tablet, embedded device, or similar environment.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for efficiently and accurately processing an image in order to detect and identify one or more objects contained in the image, and present methods that may be implemented on mobile or other resource constrained devices. Embodiments of the invention introduce simple, efficient, and accurate approximations to the functions performed by a convolutional neural network (CNN); this is achieved by binarization (i.e., converting one form of data to binary values) of the weights and of the intermediate representations of data in a convolutional neural network. The inventive binarization method(s) include optimization processes that determine the best approximations of the convolution operations that are part of implementing a CNN using binary operations. As is described in greater detail herein, the inventive methods are capable of generating results in ImageNet classification accuracy that are comparable to standard full precision networks, while requiring significantly less memory and fewer floating point operations.

As will be described, most currently implemented neural networks use a 32-bit floating point data representation and arithmetic operations. However, as realized by the inventors, a reduction in the precision can result in a significant savings in memory and computational cycles. For example, using 8-bit precision operates to reduce the memory and computation by a factor of four. Embodiments of the invention extend this idea, by reducing the precision to 1-bit that only encodes positive and negative values. A recent study shows that the parameters of a convolutional neural network can have a binomial distribution. This motivated the inventors to explore the possibility of creating a neural network having binary parameters. As they recognized, the operations in $\{-1, +1\}$ translate to bitwise operations in the $\{0, 1\}$ domain, multiplication translates to an XNOR operation, and addition and subtraction translate to a bit-count operation.

Based on the results of the inventors' modeling and simulations (as described in greater detail herein), it appears that binary representation of filtering weights provides memory savings, while binary representation of convolution operations provides a reduction in the required computational resources. Separately or in combination, these features result in enabling implementation of the operations of a CNN using resource constrained devices. These devices may include mobile devices such as tablets or smartphones, as well as embedded logic in other types of devices.

Note that because binarization of weights provides one type of benefit, while binarization of operations provides a different benefit, there may be use cases where because of the resources available (such as extra memory, or extra computational power, but limited memory), only one of the binarization processes might be performed but still yield a more optimal solution. For example, when the primary limitation is memory capacity (e.g., a device with relatively low memory), then binarization of weights provides the major benefit; however, when the primary limitation is computational resources (e.g., a device with a relatively slow CPU), then binarization of operations provides the major benefit.

In one embodiment, the invention is directed to a method for processing an image, where the method includes:
  inputting data representing the image into a convolutional neural network (CNN), the CNN including a plurality of convolutional layers, a set of weights or filters for at least one of the layers, and a set of input data to the at least one of the layers;
  representing a convolution operation between the set of input data and the set of filters or weights by a product of a scaling factor and a binary representation of the set of filters or weights convolved with the set of input data; and
  applying a classification operation to an output of the last of the plurality of convolutional layers (I will insert a paraphrasing of the claims).

In another embodiment, the invention is directed to a method for processing an image, where the method includes:
  inputting data representing the image into a convolutional neural network (CNN), the CNN including a plurality of convolutional layers, a set of weights or filters for at least one of the layers, and a set of input data to the at least one of the layers;

representing a convolution operation between the set of input data and the set of filters or weights by a product of a scaling factor and a binary representation of the set of input data convolved with the set of filters or weights; and applying a classification operation to an output of the last of the plurality of convolutional layers.

In yet another embodiment, the invention is directed to a system for processing an image, where the system includes:

an ordered set of processing blocks, wherein the ordered set includes a normalization block, an activation block, a convolution block, and a pooling block, with image input data being processed in that order;

a computer-implemented process for representing the convolution block, wherein the computer-implemented process represents a convolution operation between a set of data and a set of filters or weights by a product of a scaling factor and a binary representation of the set of filters or weights convolved with the set of data; and a classifier applied to an output of the pooling block.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 2(a) is a diagram or table illustrating a comparison between the computational resources (in terms of convolution operations and memory) used in implementing a standard convolutional network and in implementing embodiments of the inventive system and methods that utilize (a) binary weights and (b) binary weights and a binary representation of certain convolutional operations/inputs;

Note that the same numbers are used throughout the disclosure and figures to reference like components and features.

DETAILED DESCRIPTION

Figure 1A:
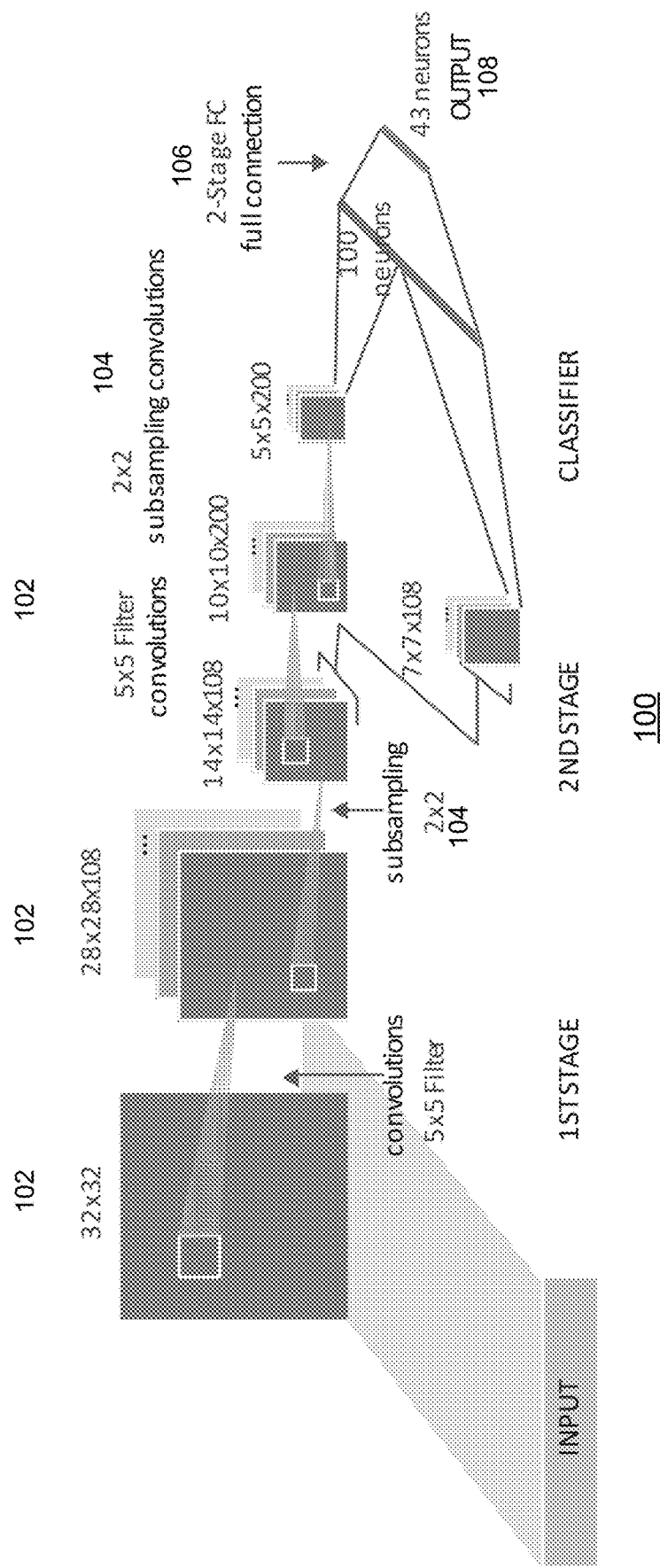
FIG. 1(a) is a diagram illustrating elements or stages of a conventional convolutional neural network (CNN), showing one or more convolutional stages, sub-sampling, and fully connected stages leading to the production of an output.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, mobile device (e.g., smartphone, tablet computer, etc.), server, network element, or other form of computing or data processing device/platform and that is programmed with a set of executable instructions (e.g., software instructions), where the instructions may be stored in a suitable data storage element.

Further, in some embodiments, one or more of the operations, functions, processes, or methods described herein may be implemented by a specialized form of hardware, such as a programmable gate array, application specific integrated circuit (ASIC), or the like. For example, certain of the functions or operations described herein may be implemented by a FPGA (field-programmable-gate-array) or other form of dedicated hardware structure or device. The following detailed description is, therefore, not to be taken in a limiting sense.

Embodiments of the present invention are directed to systems, apparatuses, and methods for more efficiently performing certain mathematical operations that may be used in the processing of an image and the recognition of an object or person. Such image processing and recognition functions may be part of a decision process, such as found in a security, access control, robotic, machine vision, vehicle control, or other application. Thus, embodiments of the invention are directed to systems, apparatuses, and methods for efficiently and accurately processing an image using a convolutional neural network (CNN) in order to detect and identify one or more objects contained in the image, and present methods that may be implemented on mobile or other resource constrained devices.

Embodiments of the invention introduce efficient and accurate approximations to the functions performed by a convolutional neural network; this is achieved by binarization (i.e., converting one form of data to binary values) of the weights/filters and/or of the intermediate representations of data in a convolutional neural network. The binarization method is optimized to determine the "best" approximations for the convolution operations using binary operations. As is described herein, the inventive methods are capable of generating results in ImageNet classification accuracy numbers that are comparable to standard full precision networks, while requiring significantly less memory and fewer floating point operations. This makes the inventive methods well suited for implementation in mobile devices that utilize standard CPUs, as opposed to more expensive and complex dedicated processors, such as GPUs.

As mentioned, based on the results of the inventors' modeling and simulations (as described in greater detail herein), it appears that binary representation of weighting/filtering provides memory savings, while binary representation of convolution operations provides a reduction in the required computational resources. This results in enabling implementation of the operations of a CNN using resource constrained devices, such as mobile devices (e.g., tablets or smartphones), as well as embedded logic in other types of devices.

Note that a convolution operation consists of repeating a shift operation and a dot product. A shift operation moves a weight filter over the input, and the dot-product operation performs element-wise multiplications between the real-values of the weight filter and the corresponding part of the real-value input, with both the weight filter and inputs expressed as tensors. Therefore, as recognized by the inventors, if a dot product is expressed in terms of binary operations, then a convolution operation can be approximated using binary operations. Further, a dot-product between two binary vectors can be implemented by use of XNOR and bit-counting operations.

This suggested to the inventors that the image processing performed by a CNN could be approximated by use of binary weights/filters and/or binary representations of the intermediate stage input values. Further, the inventors determined a process for optimizing the selection of the weights by selection of an appropriate scaling factor.

In some embodiments of the invention (herein termed "Binary-Weight-Networks" or applications thereof), the weighting or filter values are approximated with binary values. As determined by the inventors, a convolutional neural network with binary-value filter weights is significantly smaller (~32×) than an equivalent network with single-precision weight values. In addition, when the weight values are binary, convolutions can be estimated by use of only addition and subtraction operations (i.e., without multiplication), resulting in a factor of ~2× speed up in performing convolution operations. Binary-weight approximations of large CNNs are therefore believed to be able to be implemented using the memory of even relatively small, portable devices while maintaining an acceptable level of accuracy.

In other embodiments of the invention (herein termed "XNOR-Networks" or applications thereof), both the filters/weights and the inputs to the convolutional and fully connected layers are represented (i.e., typically approximated) by binary values. As recognized by the inventors, use of binary weights/filters and binary inputs provides an efficient way of implementing convolutional operations; this is at least partially because if the operands of the convolutions are represented in binary form, then the convolutions can be estimated by use of XNOR and bit-counting operations.

As determined by the inventors, XNOR-Networks provide accurate approximation of CNNs while offering ~58× speed up in the operation of a CPU. This means that XNOR-Networks may enable performance of real-time inference in devices with relatively smaller memory and no GPU (as inference operations in XNOR-Networks can be done efficiently on CPUs). This makes such an implementation more practical for mobile devices, embedded devices, and other resource constrained processing architectures or environments, particularly when it comes to processing images for purposes of object recognition and/or classification.

Use of an embodiment of the inventive system and methods permits realistic and practical implementations of image processing and object recognition for purposes of object detection and identification to be performed using CPUs of the type and capabilities found in mobile devices; the combination of such devices with embedded cameras and imaging optics, along with location finding (e.g., GPS) capabilities, may enable new applications in the areas of mapping, security, authentication, etc. For example, embodiments of the invention enable the performance of relatively sophisticated tasks (e.g., object detection) on commodity-type consumer devices (e.g., small cameras) without requiring connection to an external server. This creates an opportunity for cheaper and scalable smart security cameras, smart person tracking, portable video analysis, etc.

As mentioned previously, a key part of implementing a convolutional neural network is performing convolutional operations between a large tensor of real-value input and an smaller tensor of real-value weight filter. This requires multiplication, addition and subtraction operations. However, as recognized by the inventors, if binary weight filters are used, then a convolution operation can be performed without a multiplication operation. As noted, binarizing the weights reduces the model size by a factor of 32 and computation by a factor of two. If the approach is taken further and includes binarizing both the inputs and the weights, then a convolution operation can be implemented without arithmetic operations and only use logical operations XNOR and Bit-Count.

FIG. 2(a) is a diagram or table illustrating a comparison between the computational resources (in terms of convolution operations and memory) used in implementing a standard convolutional network and in implementing embodiments of the inventive system and methods that utilize (a) binary weights and/or (b) binary weights and a binary representation of certain convolutional operations/inputs. As shown or suggested in the figure, the different image processing operations performed on the image 202 result in differences in the operations used to implement a convolution, different expected amounts of memory usage and CPU usage, and in different degrees of accuracy when evaluated against a standard data set (in this case the AlexNet set of images).

For example, performing the image processing and recognition using a standard convolution operation (as suggested by row 204) involves real-value inputs and real-value weights (as suggested in the column titled "Network Variations" 210 in the figure), and is computed using addition, subtraction, and multiplication operations (as suggested in the column titled "Operations Used in Convolution" 212 in the figure). The relative amount of data memory used is shown in the column entitled "Memory Saving (inference)" 214 in the figure. The relative amount of data processing operations used is shown in the column entitled "Time Saving on CPU (inference)" 216 in the figure. As is shown, for the Standard Convolution 204 example, the memory saving and time saving are normalized to 1× to represent the baseline case against which the improvements provided by embodiments of the invention will be compared. The column entitled "Accuracy on ImageNet (AlexNet) 218 represents the accuracy obtained using that image processing operation in a known image processing and recognition "test", that of the AlexNet set of images. As shown, performing image processing and recognition using standard convolution operations is expected to produce an accuracy measure of 56.7% on the test case images.

As is also shown in the figure, performing the image processing and recognition using an embodiment of the inventive system and methods in which binary weights are used (as suggested by row 206) involves real-value inputs and binary weights (as suggested in the column titled "Network Variations" 210 in the figure), and is computed using addition and subtraction operations (as suggested in the column titled "Operations Used in Convolution" 212 in the figure). The relative savings expected in terms of memory used is a factor of approximately 32, i.e., the amount of data storage memory required is expected to be approximately 1/32 of that used in the standard convolution case. The savings in computational time is expected to be a factor of approximately two, i.e., the amount of CPU processing time required is expected to be approximately ½ of that used in the standard convolution case. The expected degree of accuracy at performing the image processing and recognition in the test images case is expected to be 53.8%, a relatively small decrease from the result obtained in the standard convolution case.

As is also shown in the figures, performing the image processing and recognition using an embodiment of the inventive system and methods in which binary weights and binary inputs are used (as suggested by row 208) involves binary inputs and binary weights (as suggested in the column titled "Network Variations" 210 in the figure), and is computed using XNOR and bit counting operations (as suggested in the column titled "Operations Used in Convolution" 212 in the figure). The relative savings expected in terms of memory used is a factor of approximately 32, i.e., the amount of data storage memory required is expected to be approximately 1/32 of that used in the standard convolution case. The savings in computational time is expected to be a factor of approximately 58, i.e., the amount of CPU processing time required is expected to be approximately 1/58 of that used in the standard convolution case. The expected degree of accuracy at performing the image processing and recognition in the test images case is expected to be 44.2%, a larger but still potentially acceptable decrease from the result obtained in the standard convolution case.

Figure 1B:
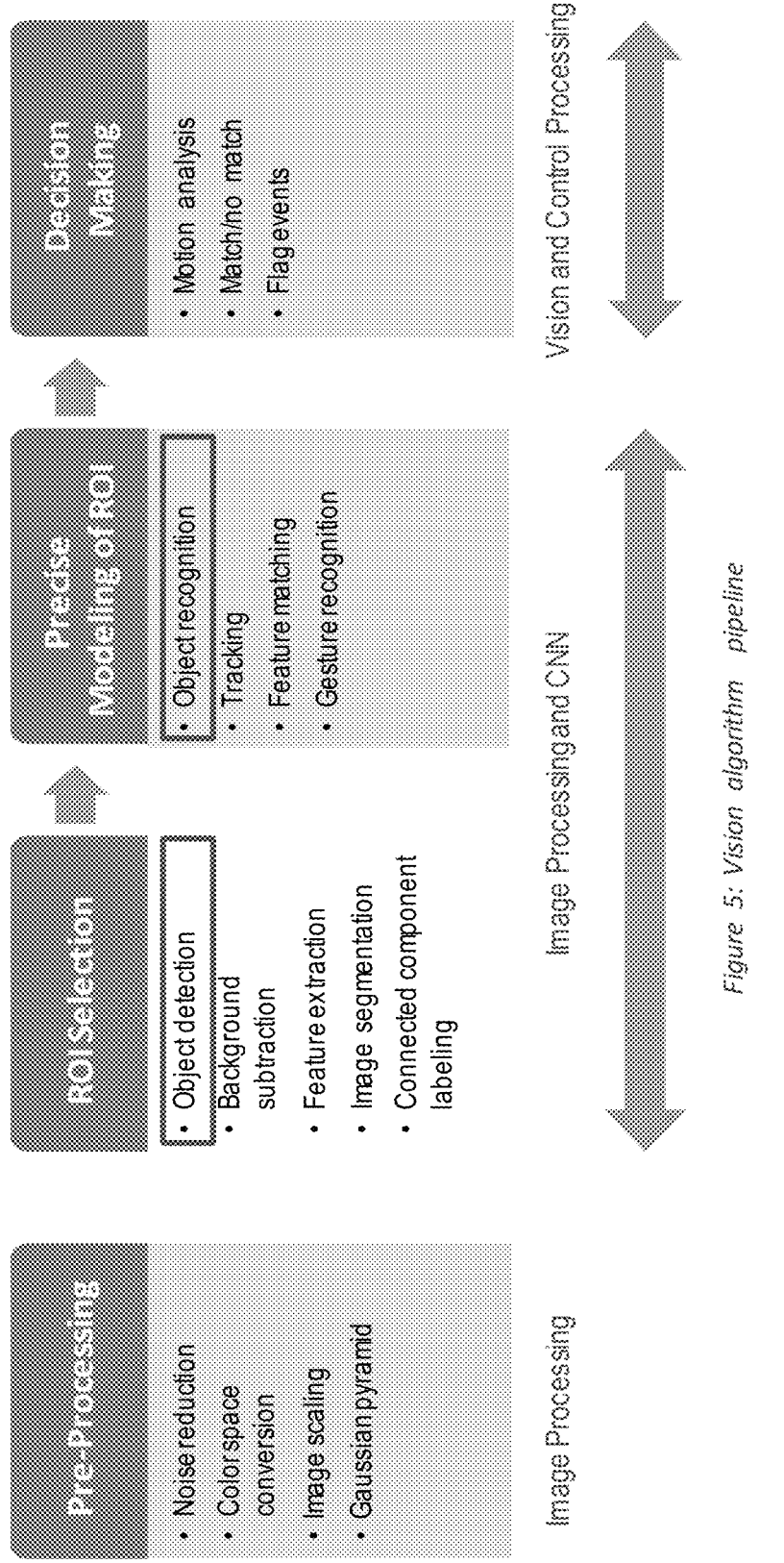
FIG. 1(b) is a diagram illustrating a conventional image-processing pipeline, which may incorporate a convolutional neural network (CNN)

It is noted that some of the information presented in the Table of FIG. 1 was obtained from the execution and evaluation of test case data by the inventors; further information regarding aspects of the implementation and evaluation of the inventive methods may be found in the article entitled "XNOR-Net: ImageNet Classification Using Binary Convolutional Neural Networks" which is part of the Appendix submitted with the U.S. Provisional Application No. 62/322,544, entitled "System and Methods for Efficiently Implementing a Convolutional Neural Network Incorporating Binarized Filter and Convolution Operation for Performing Image Classification," and which is incorporated herein by reference in its entirety for all purposes.

Figure 2B:
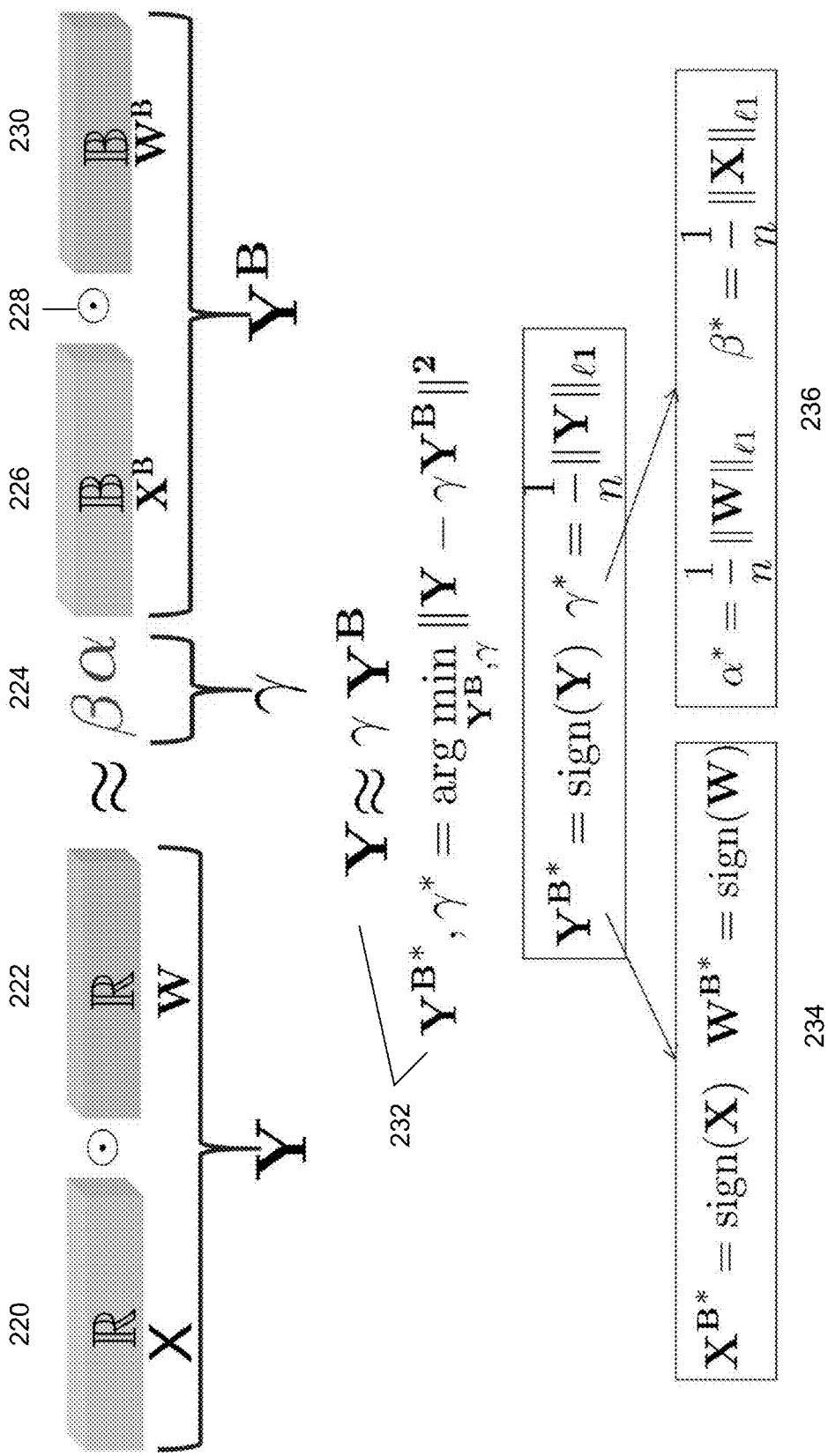
FIG. 2(b) is a diagram illustrating how the convolution between a real valued set of inputs and a real-valued set of weights or filters may be approximated by a product of two scaling factors and the convolution of a Binarized set of inputs and a Binarized set of weights or filters as part of implementing an embodiment of the inventive systems and methods.

FIG. 2(b) is a diagram illustrating how the convolution between a real valued set of inputs and a real-valued set of weights or filters may be approximated by a product of two scaling factors and the convolution of a Binarized set of inputs and a Binarized set of weights or filters as part of implementing an embodiment of the inventive systems and methods.

As shown in the figure, in accordance with at least some embodiments of the inventive systems and methods, a convolution operation between a real-valued set of inputs (X) 220 and a real-valued set of weights or filters (W) 222 may be approximated by the product of two properly determined scaling factors (13a) 224 and a binarized representation of the inputs ($X^B$) 226 "convolved" with a binarized representation of the weights or filters ($W^B$) 230, where the convolution operation 228 is represented by a series of operations that will be described. The scaling factors are determined by solving the optimization problem indicated 232 (which is described in greater detail herein), with the binarized representation(s) of the inputs and weighting factors given by the expressions shown 234 ($X^{B*}$, $W^{B*}$) and the scaling factors given by the expressions shown 236 ($\alpha^*$, $\beta^*$).

Figure 2C:
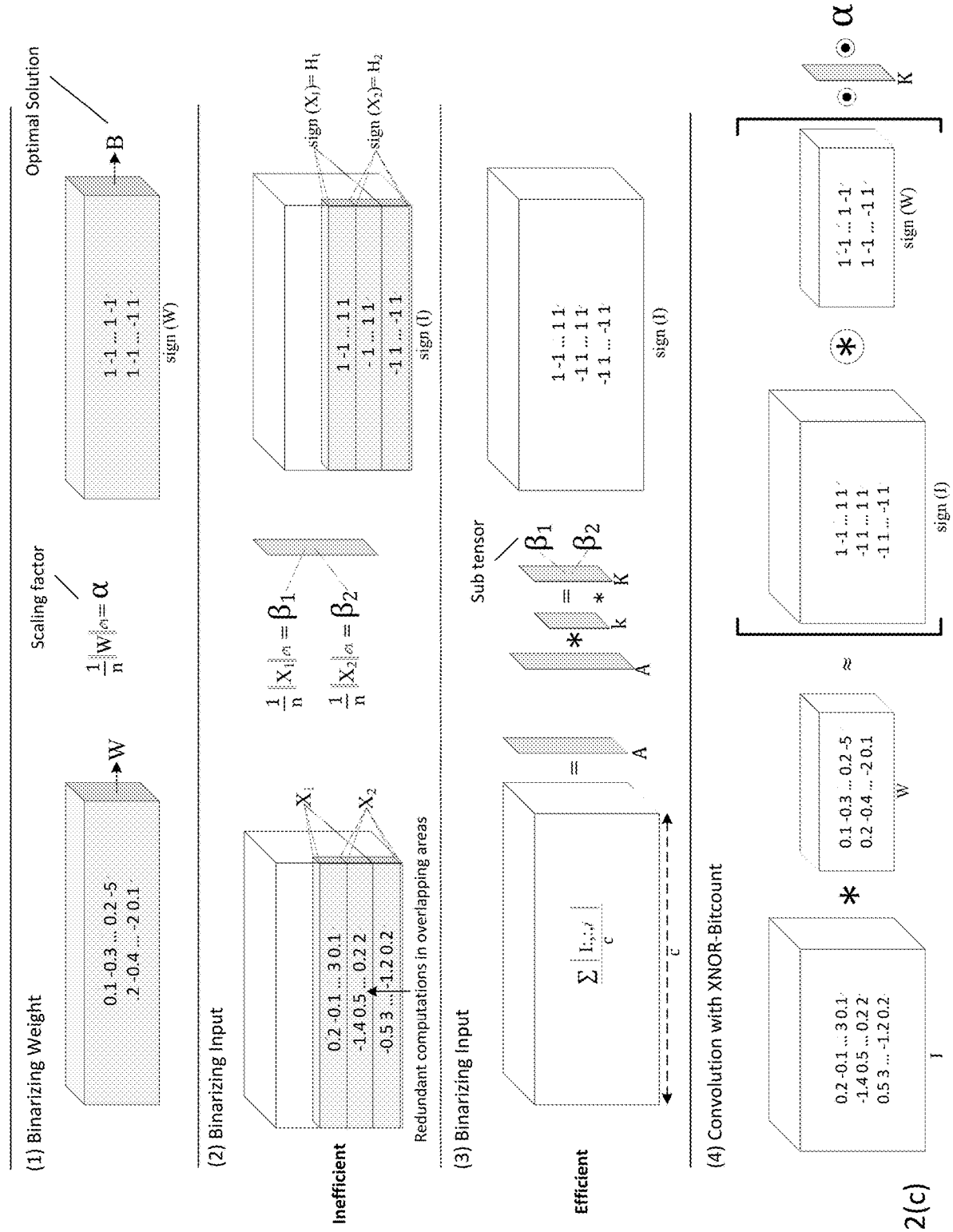
FIG. 2(c) is a diagram illustrating further aspects of the binarization and convolution operations referenced by FIG. 2(b) and that may be implemented in an embodiment of the inventive systems and methods.

FIG. 2(c) is a diagram illustrating further aspects of the binarization and convolution operations referenced by FIG. 2(b) and that may be implemented in an embodiment of the inventive systems and methods. As shown or suggested by the Figure, the inventors developed a method or process for performing a convolution operation using an XNOR operation (the logical complement of the exclusive OR operation) in combination with a bit-counting operation, where the XNOR truth table is given below:

| Input | | Output |
| --- | --- | --- |
| A | B | A XNOR B |
| 0 | 0 | 1 |
| 0 | 1 | 0 |
| 1 | 0 | 0 |
| 1 | 1 | 1 |

The inventive method or process includes a binarization of the filter or weights of a convolutional network (or a layer of the network) and a binarization of the inputs to the network (or to a layer of the network), where the binarization processes may be used separately or in combination. The binarization processes and their implementation(s) are described in greater detail in the following sections.

Embodiments of the inventive system and methods are premised on representing an L-layer CNN architecture by a triplet (I, W, *). Here I is a set of tensors, where each element $I=I_l$ (l=1 ..., L) is the input tensor for the lth layer of the CNN (as illustrated by the cubes in FIG. 2(a)). W is a set of tensors, where each element in this set $W=W_{lk}$ (k=1 ..., $K^l$) is the kth weight filter in the lth layer of the CNN. $K^l$ is the number of weight filters in the lth layer of the CNN. The operation "*" represents a convolutional operation with l and W as its operands. As mentioned, two variations of a binarized CNN are described herein: Binary-Weight-Networks, where the elements of W are binary tensors, and XNOR-Networks, where elements of both I and W are binary tensors.

In order to constrain a convolutional neural network of the type defined by the triplet (l, W, *) to have binary weights, embodiments of the invention estimate the real-value weight filter W ∈W using a binary filter B ∈{+1, −1} and a scaling factor $\alpha \in \mathbb{R}^+$, such that W≈αB. This representation of the weight filter W replaces the filter with binary values in coordination with selecting a scaling factor such that the result (αB) represents an optimal approximation to the conventional element wise product. Note that the introduction of the scaling factor α (which also operates to improve accuracy by reducing the quantization error that may arise from binarization) and the formulation of the optimization relationship described below are an aspect of the inventors' approach that is not found in conventional approaches to performing the operations used as part of a CNN.

A solution to the statement of the optimization problem operates to jointly optimize for a scaling factor α ("alpha") and for a binary filter that minimizes the reconstruction error for the original weight filter. Thus, determining alpha (α) subject to the conditions of the optimization problem stated by the inventors produces an expression, W≈αB that minimizes the error in the estimation of the filter or weighting values when those values are binarized.

Given the above assumptions regarding the form of the convolution operation and its tensor components, an optimal estimation for W≈αB may be found by solving the optimization problem represented by:

$$J(B,\alpha)=\|W-\alpha B\|^2$$

$$\alpha^*,B^*=\text{argmin } J(B,\alpha)$$

$$\alpha,B$$

As described in the incorporated article entitled "XNOR-Net: ImageNet Classification Using Binary Convolutional Neural Networks", this equation may be expanded, and with proper substitution, can be written in a form such that the optimal solution for B can be found when B*=sign (W). In order to find the optimal value for the scaling factor α*, we take the derivative of the expanded expression for J with respect to a and set it to zero:

$$\alpha^* = \frac{W^T B^*}{n}$$

The substitution of B* with sign (W) results in:

$$\alpha^* = \frac{W^T \text{ sign}(W)}{n} = \frac{\sum |W_i|}{n} = \frac{1}{n}\|W\|\ell 1$$

Therefore, the optimal estimation of a binary weight or filter can be achieved by taking the sign of weight values, and the optimal scaling factor (α) is the average of the absolute weight values. Thus, as determined by the inventors, the filters or weights used in a CNN may be replaced with a sign value and an appropriately chosen scaling value (α). This permits the approximation of a real value convolution by a binary filter and an appropriate scaling factor.

Based on using this minimized error estimation, a convolutional operation can be approximated by:

$$I*W \approx (I \oplus B)\alpha$$

where ⊕ indicates a convolution without using a multiplication operation. Since the weight values are binary, the convolution can be implemented with addition and subtraction operations. Note that the binary weight filters reduce memory usage by a factor of ~32× when compared to single-precision filters. A CNN with binary weights is represented by (⟨I, A, β, ⊕⟩), where β is a set of binary tensors and A is a set of positive real scalars, such that $B=\beta_{lk}$ is a binary filter and $\alpha=A_{lk}$ is a scaling factor and $W_{lk} \approx A_{lk}\beta_{lk}$.

Training a Binary Weight Neural Network

Each iteration of training a CNN involves three steps; forward pass, backward pass and parameters update. To train a CNN with binary weights (in convolutional layers), the approach binarizes the weights during the forward pass and backward propagation. For updating the parameters, the high precision (real-value) weights are used. Because in gradient descent techniques the parameter changes are relatively small, binarization after updating the parameters ignores these changes and the training objective cannot be improved.

The sequence of operations below (labeled Algorithm 1) demonstrates a procedure for training a CNN with binary weights. First, binarize the weight filters at each layer by computing B and A. Next, call forward propagation using binary weights and the corresponding scaling factors, where all of the convolutional operations are implemented by the equation I*W≈(I⊕B)α. Next, call backward propagation, where the gradients are computed with respect to the estimated weight filters W. Lastly, the parameters and the learning rate are updated by an update rule e.g., SGD update with momentum or ADAM. Once the training is finished, there is no need to keep the real-value weights, because at inference the approach performs forward propagation with the binarized weights.

---

Algorithm 1 Training an L-layers CNN with binary weights:

---

Input: A minibatch of inputs and targets (I, Y), cost function C(Y, Y), current weight $W^t$ and current learning rate $n^t$
Output: updated weight $W^{t+1}$ and updated learning rate $n^{t+1}$
1: Binarizing weight filters:
2:   for l = 1 to L do
3:     for $k^{th}$ filter in $l^{th}$ layer do 4: $$A_{lk} = \frac{1}{n}\|W_{lk}^t\|_{\ell 1}$$

5:     $B_{lk} = \text{sign}(W_{lk}^t)$
6:     $\widetilde{W}_{lk} = A_{lk}B_{lk}$
7: $\hat{Y}$ = BinaryForward(I, B, A) // standard forward propagation except that convolutions are computed using equation 1 or 11

8: $$\frac{\partial C}{\partial \widetilde{W}} = \text{Binary Backward}\left(\frac{\partial C}{\partial \hat{Y}}, \widetilde{W}\right)$$

// standard backward propagation except that gradients are computed using $\widetilde{W}$ instead of $W^t$ 9: $$\widetilde{W} = \text{Update Parameters}\left(W_t, \frac{\partial C}{\partial w}n_t\right)$$

// Any update rules (e.g., SGD or ADAM)

10: $n^{t+1}$ = UpdateLearningrate($n^t$, t) // Any learning rate scheduling function

---

This training algorithm may also be represented by the sequence below:

---

1.   Randomly initialize W
2.   For iter = 1 to N
3.     Load a random input image X
4.     $W^B = \text{sign}(W)$ 5. $$\alpha = \frac{\|W\|_{\ell 1}}{n}$$

| | |
|---|---|
| 6. | Forward pass with $\alpha$, $W^B$ |
| 7. | Compute loss function C |
| 8. | $\frac{\partial C}{\partial W}$ = Backward pass with $\alpha$, $W^B$ |
| 9. | Update $W\left(W = W - \frac{\partial C}{\partial W}\right)$ |

XNOR-Networks

As described, embodiments of the invention using binary weights or filters include the determination of a scaling factor to estimate/optimize the real-value weights. However, in some implementations, the inputs to the convolutional layers were real-value tensors. In this embodiment (termed XNOR Networks), both the filters/weights and the inputs are subjected to binarization; this permits a convolution operation to be implemented efficiently using XNOR functions and bit-counting operations. In order to constrain a convolutional neural network of the form (I, W, *) to have binary filters/weights and binary inputs, in some embodiments the inventive approach enforces binary operands at each step of the convolutional operation. As noted, a convolution operation may be considered as a repeating a shift operation and a dot product. The shift operation moves the weight filter over the input and the dot product performs element-wise multiplications between the values of the weight filter and the corresponding part of the input. If a dot product is expressed in terms of binary operations, then a convolution operation can be approximated using binary operations, where the dot product between two binary vectors can be implemented by use of XNOR and bit-counting operations.

In an implementation of the inventive XNOR-Network, it is desired that both weights or filters and the input tensor be represented by binary values. Note that an aspect of this type of network is very similar to the binary weight network; it is desired to find a binary version of the input X and of the Weight W such that using the binarized versions approximates the element-wise product when using real-values (as described with reference to FIG. 2(b)). Based on the binarized weighting/filter analysis, it is known that a scaling factor plays a role; therefore in this problem statement involving binarized weights and inputs, two scaling factors are used (denoted as $\alpha$ and $\beta$), one for the input and another one for the weight. This problem statement can be converted into a single tensor binary approximation, for which it is known how to find a closed form solution. Using this approximation, one can find an optimal solution for the Weight tensor and for the Input tensor. The optimization problem and an optimal solution are illustrated in FIG. 2(b).

Following this approach, embodiments of the invention approximate the dot product between two vectors in Rn by a dot product (referred to as a binary dot product) between two vectors in $\{+1, -1\}^n$. This approximation is used to estimate a convolutional operation between two tensors.
Binary Dot Product: To approximate the dot product between X, W$\in \mathbb{R}^n$ such that $X^T W \approx \beta H^T \alpha B$, where H, B $\in \{+1, -1\}^n$ and $\beta$, $\alpha \in \mathbb{R}^+$, the following optimization problem or statement is solved:

$$\alpha^*, B^*, \beta^*, H^* = \operatorname{argmin} \|X^T W - \beta\alpha H^T B\|$$

$$\alpha, B, \beta, H$$

Define $Y \in \mathbb{R}^n$ such that $Y_i = X_i W_i$, $C \in \{+1, -1\}^n$ such that $C_i = H_i B_i$ and $\gamma \in \mathbb{R}^+$ such that $\gamma = \beta\alpha$. Then the optimization equation can be (re)written as:

$$\gamma^*, C^* = \operatorname{argmin} \|1^T Y - \gamma 1^T C\|$$

$$\gamma, C$$

where 1 is an n-dimensional vector with all of its entries being 1. Note that $1^T$ can be factored out from the optimization and the optimal solutions can be achieved as follows $$C^* = \operatorname{sign}(Y) = \operatorname{sign}(X^T)\operatorname{sign}(W) = H^{*T} B^*$$

Since $|X_i|$, $|W_i|$ are independent, knowing that $Y_i = X_i W_i$ then, $$E[|Y_i|] = E[|X_i W_i|] = E[|X_i|]E[|W_i|] \text{ and therefore,}$$

$$\gamma^* = \frac{\sum |Y_i|}{n} = \frac{\sum |X_i||W_i|}{n} \approx \left(\frac{1}{n}\|X\|\ell 1\right)\left(\frac{1}{n}\|W\|\ell 1\right) = \beta^* \alpha^*$$

Binary Convolution

Convolving weight filter $W \in \mathbb{R}^{c \times w \times h}$ (where $w_{in} \gg w$, $h_{in} \gg h$) with the input tensor $I \in \mathbb{R}^{c \times w_{in} \times h_{in}}$ requires computing the scaling factor $\beta$ for all possible sub-tensors in I with same size as W. Two of these sub-tensors are illustrated in FIG. 2(c) (in the second row) by $X_1$ and $X_2$. Note that due to overlaps between sub-tensors, computing $\beta$ for all possible sub-tensors leads to a large number of redundant computations. To overcome this redundancy, the inventive method computes a matrix $$A = \frac{\Sigma |I_{:,:,i}|}{c}$$

which is the average over absolute values of the elements in the input I across the channel. Next, the method operates to convolve A with a 2D filter $k \in \mathbb{R}^{w \times h}$, K=A*k, where $$\forall_{ij} = \frac{1}{w \times h}.$$

Note that K contains scaling factors $\beta$ for all sub-tensors in the input I. The term $K_{ij}$ corresponds to $\beta$ for a sub-tensor centered at the location ij (across width and height). This procedure is suggested/illustrated in the third row of FIG. 2(c). Once the method obtains the scaling factor $\alpha$ for the weight and for all sub-tensors in I (denoted by K), the method can approximate the convolution between input I and weight filter W using primarily binary operations:

$$I * W \approx (\operatorname{sign}(I) \circledast \operatorname{sign}(W)) \odot K\alpha$$

This equation or set of processes is suggested/illustrated in the fourth row of FIG. 2(c).

Data Processing Block and Pipeline

Figure 2D:
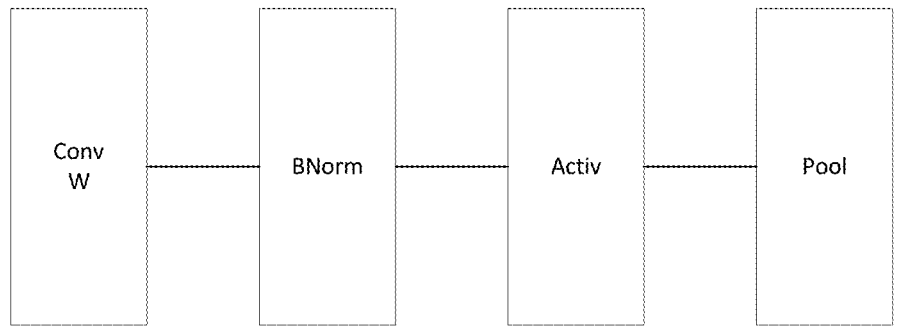
FIG. 2(d) is a diagram illustrating the functional "blocks" or order of operations used for image processing in a conventional CNN architecture (FIG. 2(d)(1)) and in an embodiment of the inventive XNOR-Network (FIG. 2(d)(2))
Figure 2D:
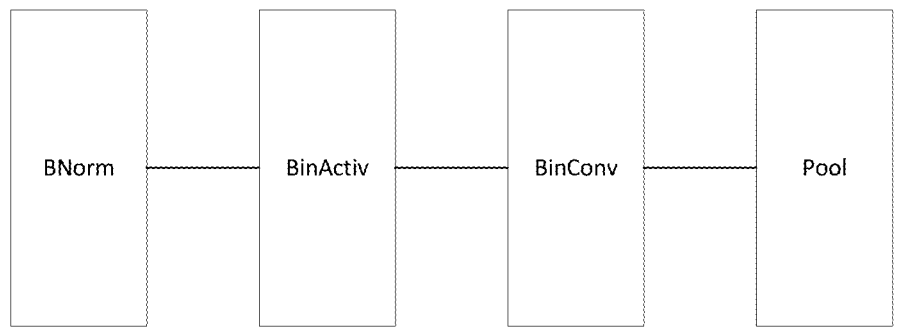

As mentioned previously, a typical processing block in a CNN contains several different functional layers; these typically include four types of layers—convolution layers, pooling/subsampling layers, non-linear layers, and fully connected layers. FIG. 2(d) is a diagram illustrating the functional "blocks" or order of operations used for image processing in a conventional CNN architecture (FIG. 2(d)(1)) and in an embodiment of the inventive XNOR-Network (FIG. 2(d)(2)).

As shown in FIG. 2(d)(1), a conventional block has four layers, implemented in the following order: 1-Convolutional (Cony), 2-Batch Normalization (BNorm), 3-Activation (Activ), and 4-Pooling (Pool). Batch Normalization normalizes the input batch by its mean and variance. The activation operation is an element-wise non-linear function (e.g., Sigmoid, ReLU). The pooling layer applies a type of pooling (e.g., max, min or average) operation to the input batch. Note that applying pooling to binary inputs may result in a significant loss of information. For example, max-pooling performed on a binary input returns a tensor that has most of its elements being equal to +1.

Therefore, in the inventive architecture or image/data processing pipeline, the pooling layer is placed after the convolution operation (as illustrated by the order of "BinConv" and "Pool" in FIG. 2(d)(2)). To further decrease the information loss due to binarization, the input is normalized (as illustrated by the order of "BNorm" and "BinActiv" in FIG. 2(d)(2)) before binarization. This ensures the data to hold zero mean, therefore, thresholding at zero leads to less quantization error.

Note that the ordering of the processing pipeline layers of a CNN implemented in accordance with the inventive image processing architecture differs from that of a conventional CNN; these differences are important to achieving the results obtained using the inventive binarization methods and approaches described herein. These methods and approaches include approximating a real value convolution with a binary valued filter and a scaling factor ($\alpha$), and representing the result of a convolution operation using XNOR operations and bit counting.

As described, the order of layers in a processing block of the inventive XNOR Network CNN is shown in FIG. 2(d)(2). As shown, it is a different order and arrangement of processing operations (i.e., Batch Normalization (BNorm), Binary Activation (BinActiv), Binary Convolution (BinConv), and Pooling (Pool)). As discussed herein, the ordering and implementation of the operations performed by the inventive XNOR-Network differs from a standard or conventional CNN and provides the capabilities and advantages described.

In the inventive architecture illustrated in FIG. 2(d)(2), the binary activation layer(BinActiv) computes K and sign (I) as explained previously. To compute the gradient for sign function q=sign(r), the process follows an approach where $g_r = g_q 1_{|r| \leq 1}$. In the next layer (BinConv), given K and sign(I), the process computes the effective binary convolution using the equation derived above. Then at the last layer (Pool), the process applies the pooling operations. Note that the process may insert a non-binary activation (e.g., ReLU) after the binary convolution; this may help when using state-of-the-art networks (e.g., AlexNet or VGG). Once the process has developed the binary CNN structure, the training algorithm would be the same as Algorithm 1 (mentioned previously with reference to the training of a binary weight network).

As noted, embodiments of the inventive system and methods introduce simple, efficient, and accurate binary approximations for neural networks, particularly for performing convolutional functions or operations. In one example implementation, the invention operates to train a neural network that learns to find binary values for weights, which reduces the size of network by ~32× and provides the possibility of loading deep neural networks into portable devices having limited memory. Further, embodiments of the invention propose an architecture, XNOR-NET, that uses mostly bitwise operations to approximate convolution operations. This provides ~58× speed up and enables the possibility of running the inference of states of a deep neural network on a CPU (rather than GPU) in real-time, thereby making image processing and object recognition more practical on a mobile or resource constrained device. In addition to the binarization aspects, the determination of an optimal scaling factor for the weights/filters and the arrangement of the processing blocks or functions are novel and inventive features of embodiments of the inventive system and methods.

The previously referred to article entitled ""XNOR-Net: ImageNet Classification Using Binary Convolutional Neural Networks" includes further information regarding the performance of the inventive architecture, both in isolation, and in comparison to conventional approaches or alternatives. It also includes a further discussion of certain implementation aspects of the block structure and block ordering used in the XNOR-Networks.

Efficiency Analysis

In a standard convolution process, the total number of operations is $cN_wN_I$, where c is the number of channels, $N_w = wh$ and $N_I = w_{in}h_{in}$. The binary approximation of a convolution operation has $cN_wN_I$ operations and $N_I$ non-binary operations. With the current generation of CPUs, one can perform 64 binary operations in one clock of CPU; therefore, the expected speedup attributable to the inventive architecture and process may be determined by:

$$S = \frac{cN_wN_I}{\frac{1}{64}cN_wN_I + N_I} = \frac{64cN_w}{cN_w + 64}$$

Note that the expected speedup depends on the channel size and filter size, but not the input size. The inventors have conducted test cases or "experiments" designed to determine the speedup achieved by changing the number of channels and filter size. While changing one parameter, the test fixes other parameters as follows: c=256, $n_I=14^2$ and $n_w=3^2$ (note that the majority of convolutions in the ResNet architecture have this structure). Using the inventive approximation of a convolution operation, there is a gain of 62.27× (theoretically) in computational speed; however, note that in the inventors' CPU implementation and considering overhead costs, an increase in speed of approximately 58× was obtained for one convolution. With a small channel size (c=3) and filter size ($N_w=1\times1$), it is noted that the speedup is not considerably high. This motivates an implementation in which binarization is avoided at the first and last layer of a CNN. In the first layer the channel size is three and in the last layer the filter size is 1×1.

Note that there are at least two important differences between the inventive architecture and methods and the previous network binarization methods; the binarization technique and the block structure in the inventive binary CNN. For binarization, the inventive method finds the optimal scaling factors at each iteration of training. For the block structure, the inventive architecture orders the layers of a block in a way that decreases the quantization loss for training XNOR-Net. In the previously mentioned article, the inventors evaluate the effect of each of these elements in the performance of the binary networks. Note that instead of computing the scaling factor ($\alpha$) using the equation presented, one can consider a as a network parameter; in other words, a layer after binary convolution multiplies the output of convolution by a scalar parameter for each filter. This is similar to computing the affine parameters in batch normalization.

Figure 3:
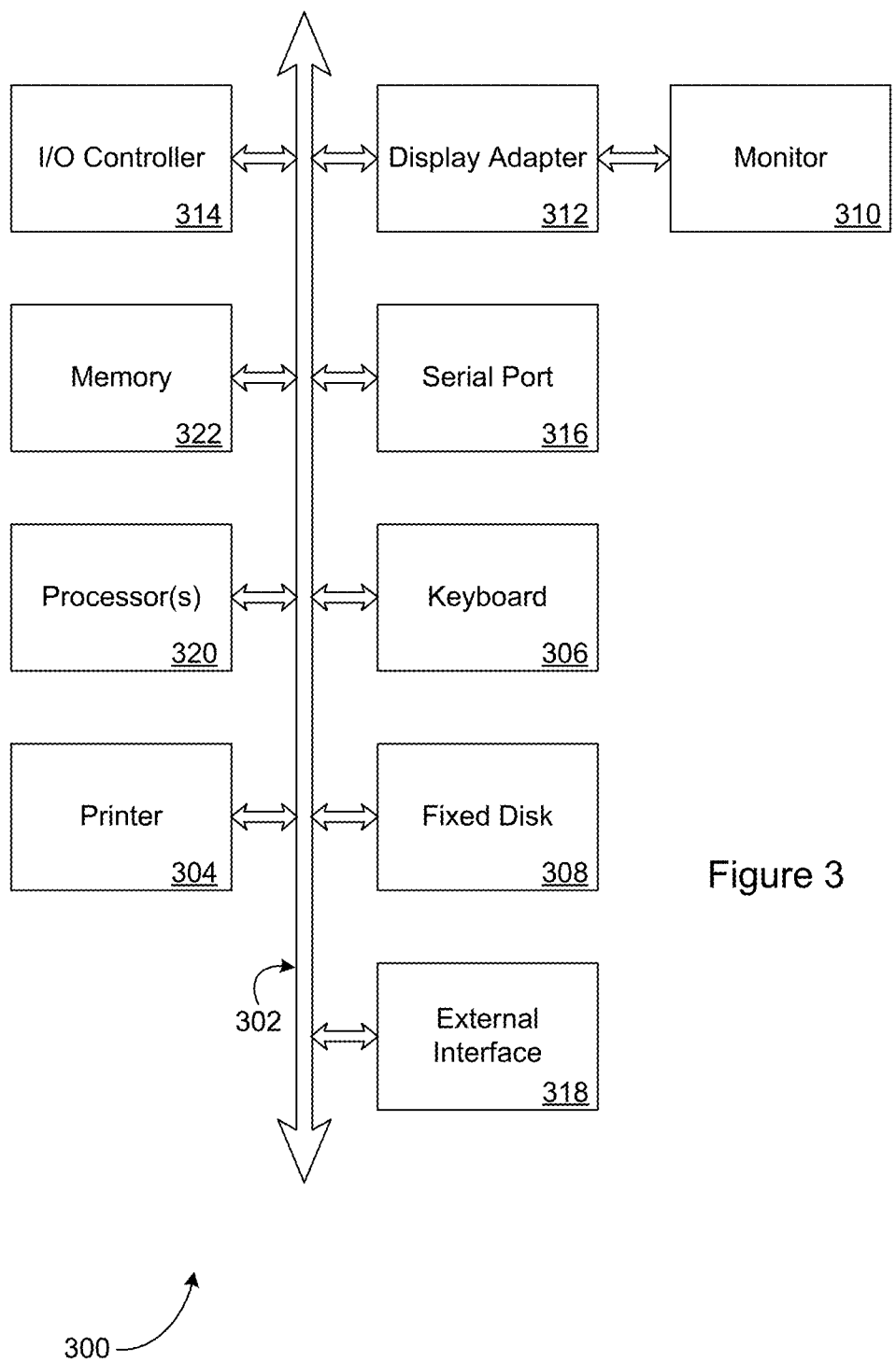
FIG. 3 is a diagram illustrating elements or components that may be present in a computer device or system configured to implement a method, process, function, or operation in accordance with an embodiment of the invention.

FIG. 3 is a diagram illustrating elements or components some of which may be present in a computing device, mobile device, or system configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the inventive system and methods (such as for approximation of a convolution operation, determination of an optimal scaling factor, application of a weight/filter to input data, etc.):

Initial processing of an image (sampling, noise reduction, scaling, etc.);

Performing a "binary" convolution operation between input data and a set of weights or filters by applying an estimation of the convolution to the data, wherein the estimation includes (a) binarization of weights/filters, (b) binarization of inputs, and (c) solving for an optimal scaling factor or factors ($\alpha$, $\beta$);

Implementing a processing pipeline in the order illustrated in FIG. 2(d)(2); and Applying a suitable decision process to classify or "recognize" an object or section or an image.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As noted, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in an apparatus, server, client, mobile device, or other computing or data processing device operated by, or in communication with, other components of the system. For example, FIG. 3 is a diagram illustrating elements or components that may be present in a computer device or system 300 configured to implement a method, process, function, or operation in accordance with an embodiment of the invention. The subsystems shown in FIG. 3 are interconnected via a system bus 302. Additional subsystems include a printer 304, a keyboard 306, a fixed disk 308, and a monitor 310, which is coupled to a display adapter 312. Peripherals and input/output (I/O) devices, which couple to an I/O controller 314, can be connected to the computer system by any number of means known in the art, such as a serial port 316. For example, the serial port 316 or an external interface 318 can be utilized to connect the computer device 300 to further devices and/or systems not shown in FIG. 3 including a wide area network such as the Internet, a mouse input device, and/or a scanner. The interconnection via the system bus 302 allows one or more processors 320 to communicate with each subsystem and to control the execution of instructions that may be stored in a system memory 322 and/or the fixed disk 308, as well as the exchange of information between subsystems. The system memory 322 and/or the fixed disk 308 may embody a tangible corn puter-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method comprising:
inputting data representing an image into a convolutional neural network (CNN), the CNN including a plurality of convolutional layers, a set of filters or weights for at least one of the convolutional layers, and a set of input data to the at least one of the convolutional layers;
performing a convolution operation between the set of input data and the set of filters or weights by determining a product of a scaling factor and a binary representation of the set of filters or weights convolved with the set of input data; and
applying an operation to an output of a last of the plurality of convolutional layers.

2. The method of claim 1, wherein the binary representation of the set of filters or weights is a sign of weight values, and the scaling factor is an average of absolute weight values.

3. The method of claim 1, further comprising representing the set of input data by a product of a scaling factor and a binary representation of the set of input data.

4. The method of claim 3, wherein the binary representation of the set of input data is a sign of input data values, and the scaling factor is an average of absolute input data values.

5. The method of claim 4, wherein the convolution operation is implemented by a combination of an XNOR operation and a bit-counting operation.

6. The method of claim 1, further comprising processing the data representing the image prior to inputting the data into the convolutional neural network, wherein the processing the data includes one or more of reducing noise in the data, scaling the data, or sampling the data.

7. The method of claim 1, wherein the scaling factor is determined by solving an optimization problem of a form given by:

$$J(B,\alpha)=\|W-\alpha B\|^2$$

$$\alpha^*,B^*=\underset{\alpha,B,}{\operatorname{argmin}} J(B,\alpha)$$

where $\alpha$ is the scaling factor, B is a binary representation of the set of filters or weights, and W is the set of filters or weights.

8. The method of claim 1, further comprising identifying, based on applying the operation to the output, an object contained in the image.

9. The method of claim 8, wherein the object contained in the image is a person.

10. The method of claim 8, further comprising authorizing use based on the identified object.

11. The method of claim 8, further comprising authorizing access based on the identified object.

12. The method of claim 8, further comprising controlling a vehicle based on the identified object.

13. A method comprising:
inputting data representing an image into a convolutional neural network (CNN), the CNN including a plurality of convolutional layers, a set of filters or weights for at least one of the convolutional layers, and a set of input data to the at least one of the convolutional layers;
performing a convolution operation between the set of input data and the set of filters or weights by determining a product of a scaling factor and a binary representation of the set of input data convolved with the set of filters or weights; and
applying an operation to an output of a last of the plurality of convolutional layers.

14. The method of claim 13, wherein the binary representation of the set of input data is a sign of data values, and the scaling factor is an average of absolute input data values.

15. The method of claim 13, further comprising representing the set of filters or weights by a product of a scaling factor and a binary representation of the set of filters or weights.

16. The method of claim 15, wherein the binary representation of the set of filters or weights is a sign of weight values, and the scaling factor is an average of absolute weight values.

17. The method of claim 16, wherein the convolution operation is implemented by a combination of an XNOR operation and a bit-counting operation.

18. The method of claim 13, further comprising processing the data representing the image prior to inputting the data into the convolutional neural network, wherein the processing the data includes one or more of reducing noise in the data, scaling the data, or sampling the data.

19. The method of claim 13, wherein the scaling factor is determined by solving an optimization problem of a form given by:

$$J(B,\alpha)=\|W-\alpha B\|^2$$

$$\alpha^*,B^*=\underset{\alpha,B,}{\operatorname{argmin}} J(B,\alpha)$$

where $\alpha$ is the scaling factor, B is a binary representation of the set of filters or weights, and W is the set of filters or weights.

20. The method of claim 13, further comprising identifying, based on applying the operation to the output, an object contained in the image.

21. The method of claim 20, wherein the object contained in the image is a person.

22. The method of claim 20, further comprising authorizing use based on the identified object.

23. The method of claim 20, further comprising authorizing access based on the identified object.

24. The method of claim 20, further comprising controlling a vehicle based on the identified object.

25. A system comprising:
a set of processing blocks, wherein the set of processing blocks includes a normalization block, an activation block, a convolution block, and a pooling block, with image input data being processed in that order;
a computer-implemented process for representing the convolution block, wherein the computer-implemented process represents a convolution operation between a set of data and a set of filters or weights by a product of a scaling factor and a binary representation of the set of filters or weights convolved with the set of data; and
a classifier applied to an output of the pooling block.

26. The system of claim 25, further comprising a computer-implemented process for representing data by a product of a scaling factor and a binary representation of the data.

27. The system of claim 26, wherein the convolution operation is implemented by a combination of an XNOR operation and a bit-counting operation.

28. The system of claim 26, wherein the binary representation of the set of data is a sign of data values, and the scaling factor is an average of absolute data values.

29. The system of claim 25, wherein the binary representation of the set of filters or weights is a sign of weight values, and the scaling factor is an average of absolute weight values.

30. The system of claim 25, wherein the scaling factor is determined by solving an optimization problem of a form given by:

$$J(B,\alpha) = \|W - \alpha B\|^2$$

$$\alpha^*, B^* = \underset{\alpha, B}{\mathrm{argmin}}\ J(B,\alpha)$$

where $\alpha$ is the scaling factor, B is a binary representation of the set of filters or weights, and W is the set of filters or weights.

31. The system of claim 25, wherein the computer implemented process further comprising identifying, based on an output of the classifier, an object contained in the image input data.

32. The system of claim 31, wherein the object contained in the image input data is a person.

33. The system of claim 31, wherein the computer implemented process further comprises authorizing use based on the identified object.

34. The system of claim 31, wherein the computer implemented process further comprises authorizing access based on the identified object.

35. The system of claim 31, wherein the computer implemented process further comprises controlling a vehicle based on the identified object.

* * * * *